Nov. 16, 1948.   W. O. VEDDER   2,453,951
DUST COLLECTOR

Filed May 3, 1944   5 Sheets-Sheet 1

Inventor
Walter O. Vedder,
William G. Hall
Attorney

Nov. 16, 1948.  W. O. VEDDER  2,453,951
DUST COLLECTOR
Filed May 3, 1944  5 Sheets-Sheet 2

Inventor
Walter O. Vedder,
William F. Hall
Attorney

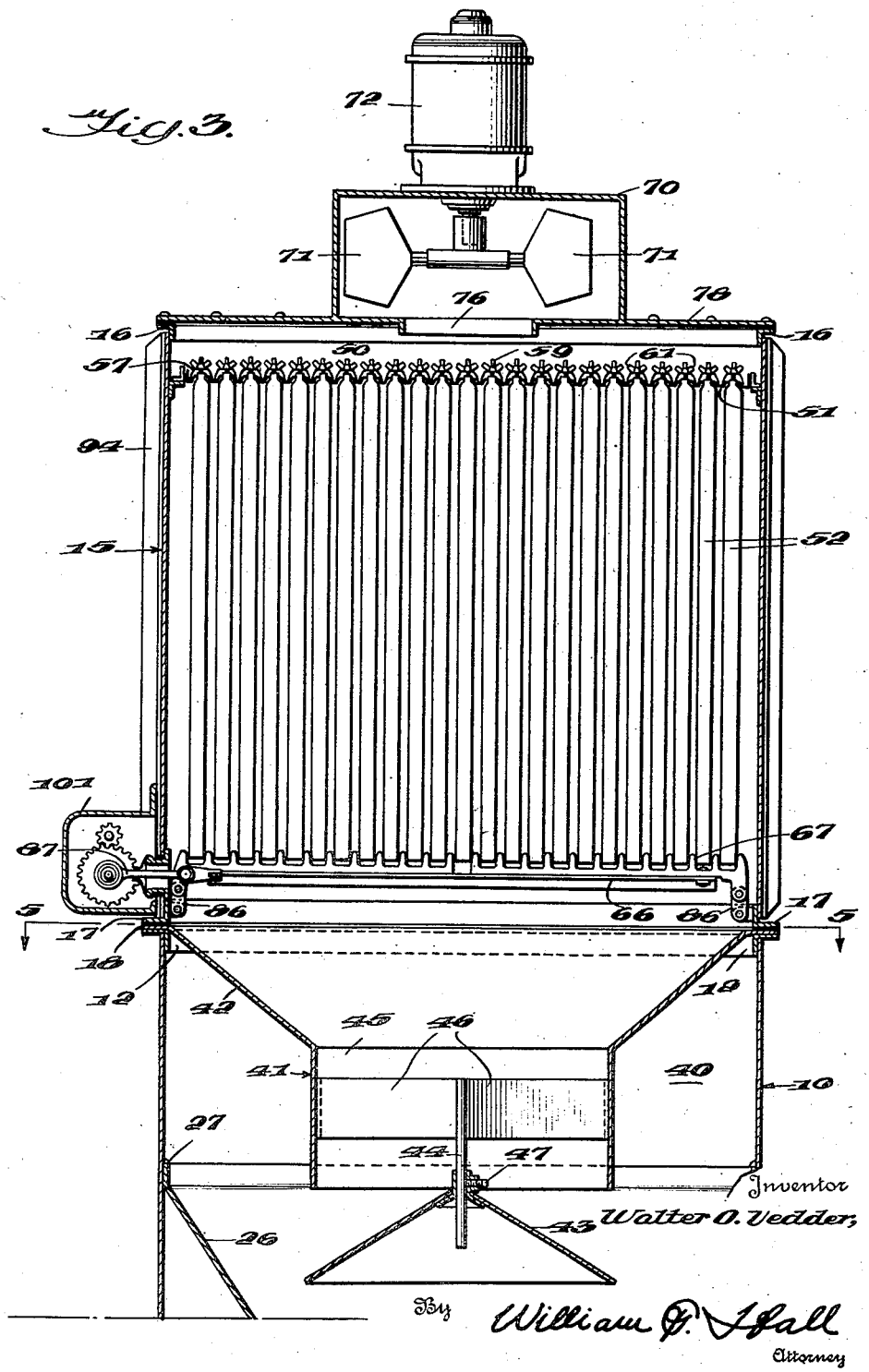

Nov. 16, 1948.　　　　W. O. VEDDER　　　　2,453,951
DUST COLLECTOR
Filed May 3, 1944　　　　　　　　　　　　5 Sheets-Sheet 4
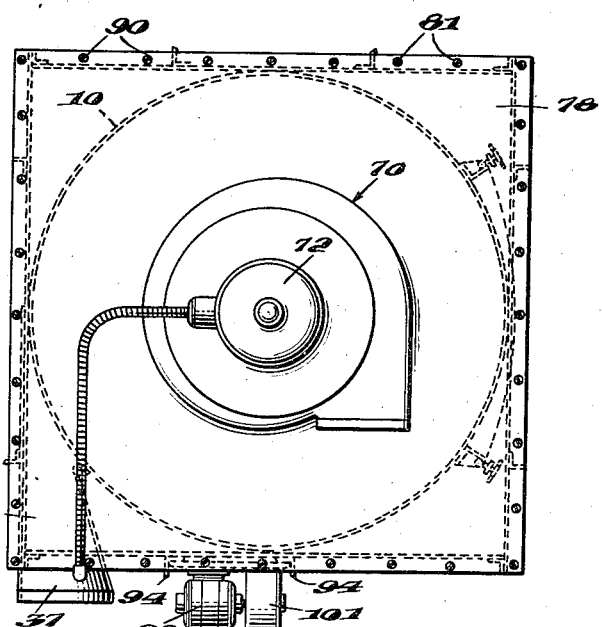
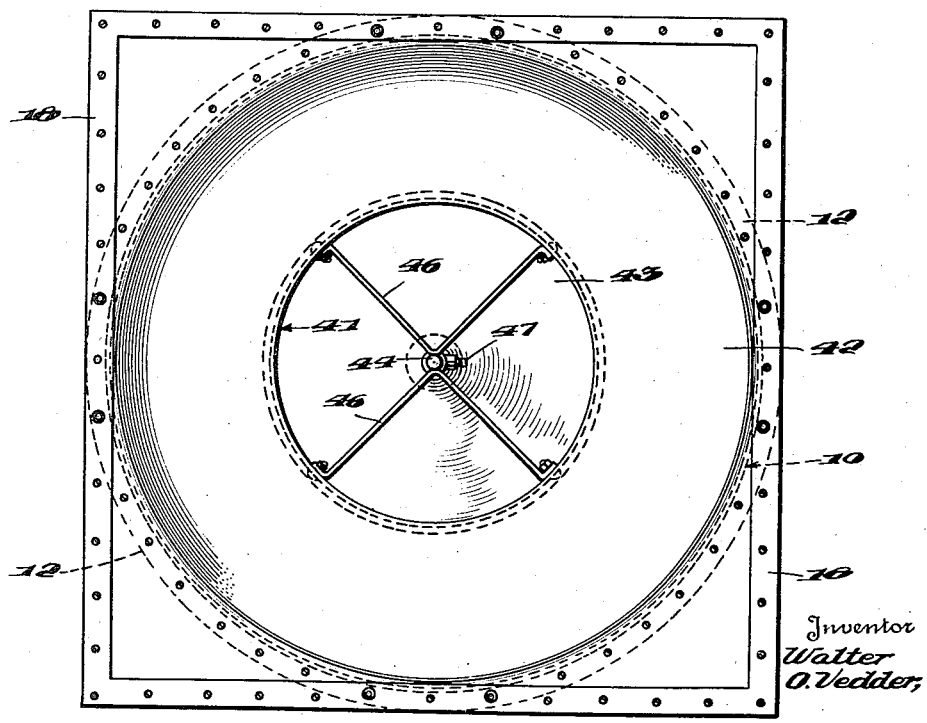
Inventor
Walter O. Vedder,
By William F. Hall
Attorney

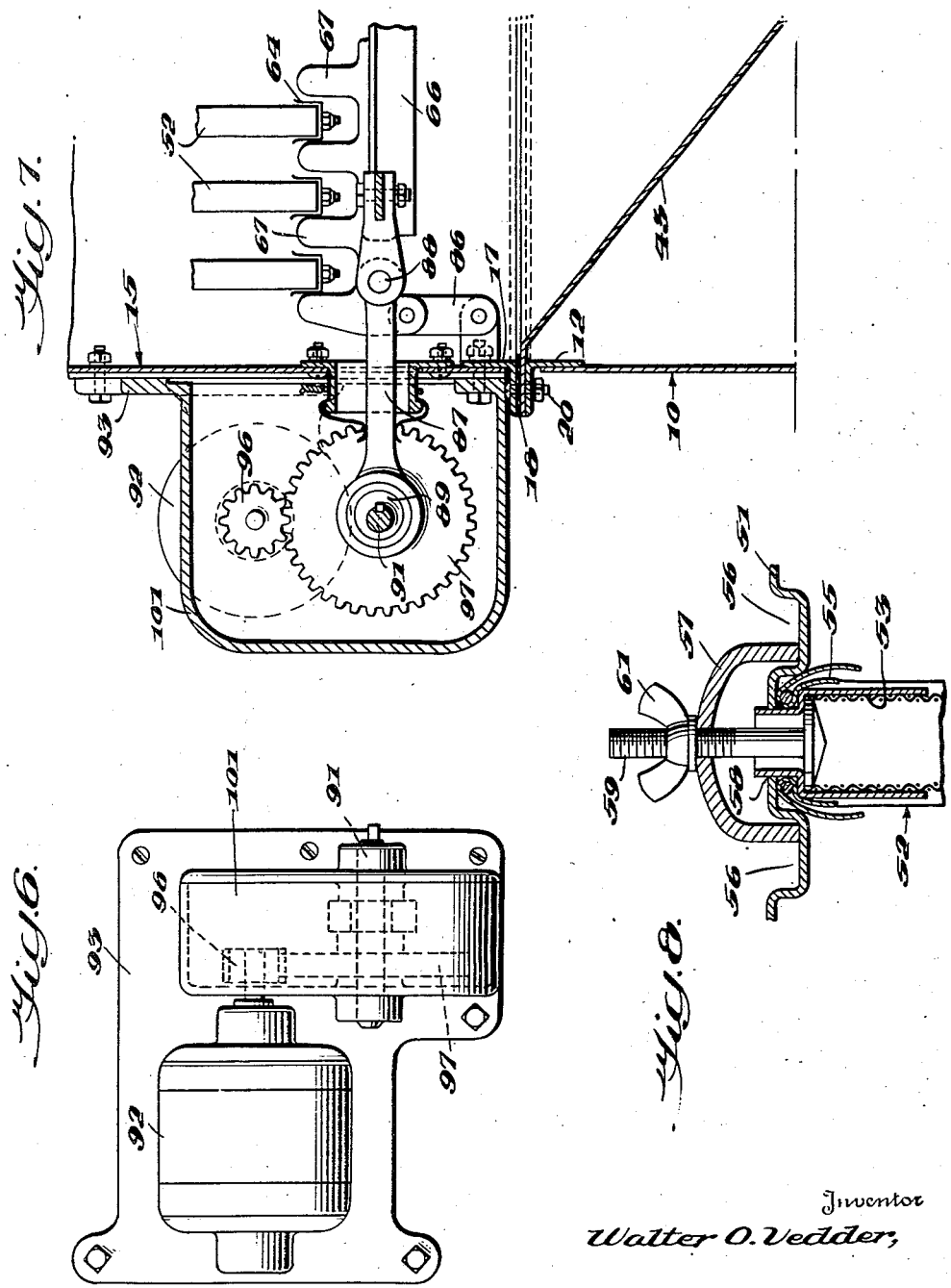

Patented Nov. 16, 1948

2,453,951

UNITED STATES PATENT OFFICE 2,453,951

DUST COLLECTOR

Walter O. Vedder, Hagerstown, Md., assignor to Pangborn Corporation, Hagerstown, Md., a corporation of Maryland Application May 3, 1944, Serial No. 533,906

6 Claims. (Cl. 183—67)

The present invention relates to filtering and collecting devices and more particularly pertains to apparatus for removing dust and like particles from a gaseous medium such as air.

An object of the invention resides in providing a unitary dust collector assembly including a preliminary centrifugal section and a secondary filtering section formed of a plurality of screening elements. The dust laden gaseous medium enters the centrifugal section where the entrained particles are separated from the carrying medium. The gaseous medium then flows into the secondary section where any remaining dust particles are effectively filtered from the air or gas. The dust precipitated from the gaseous medium in the preliminary centrifugal section and the dust collected by the filtering elements is deposited in a common receptacle for removal and disposal. The preliminary centrifugal section and the secondary filtering section are encased within a housing assembly so as to form a unitary structure whereby the apparatus may be completely fabricated and assembled to provide a complete dust collector before installation.

Other features and objects of the invention will be more apparent upon consideration of the following detailed description of dust collecting apparatus exhibiting an exemplary embodiment of the invention.

In the drawings

Fig. 3 is a sectional view taken on the line 3—3 of Fig. 2 and showing the arrangement of the filtering elements in elevation.

Fig. 4 is a plan view of the apparatus illustrating the manner in which the exhauster unit may be arranged on the apparatus.

Fig. 5 is a plan view of the baffle member taken on the line 5—5 of Fig. 3 and illustrating the manner in which the centrifugal section is adapted to be connected to the filtering section.

Fig. 6 is an enlarged elevational view of the driving means for rapping the filtering elements.

Fig. 7 is an enlarged side elevational view partly in section illustrating the details of the rapping mechanism.

Fig. 8 is an enlarged sectional view illustrating the manner in which one of the filter elements is attached to and sealed with respect to the supporting partition.

Figure 1:
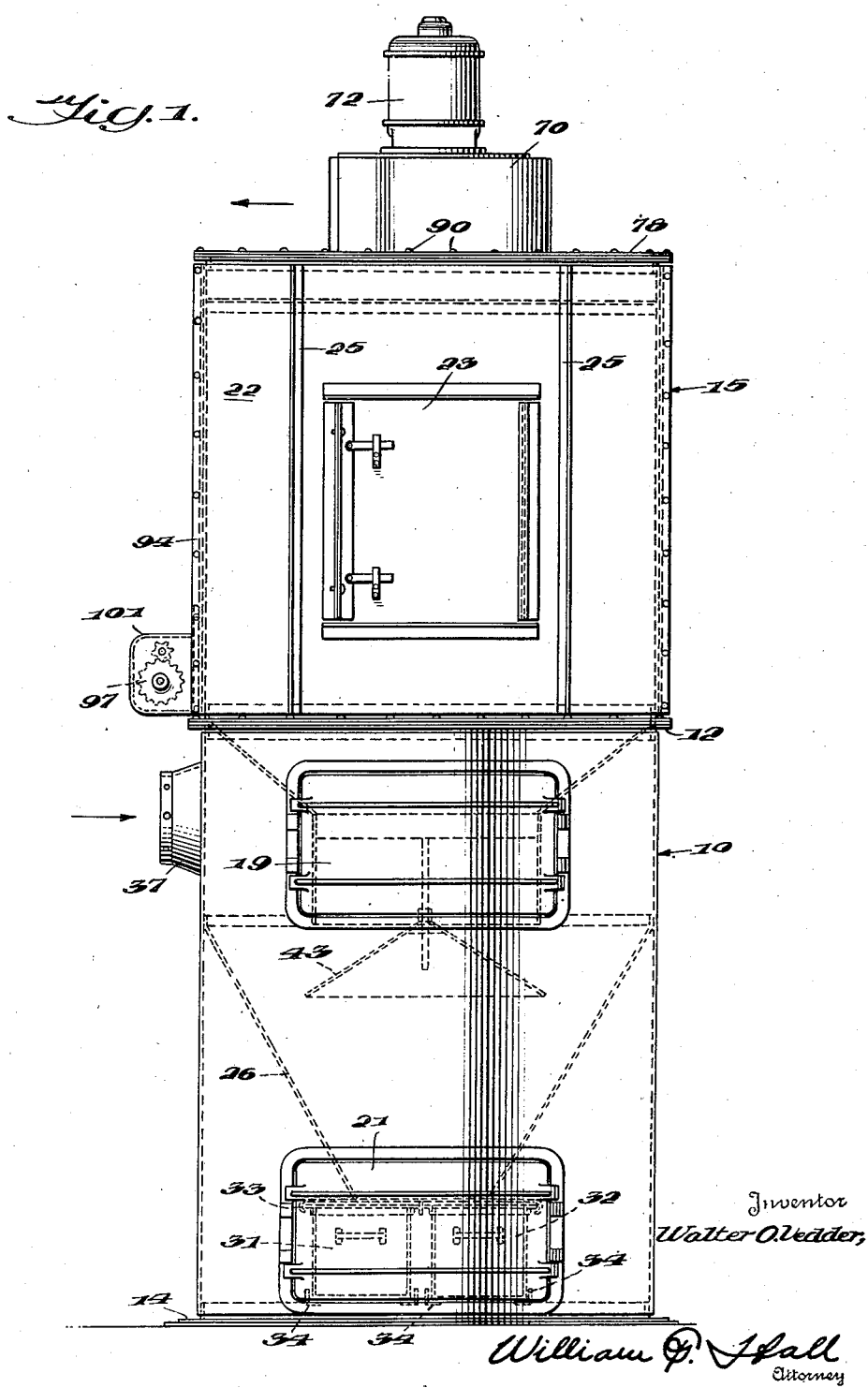
Fig. 1 is a front elevational view of dust collecting apparatus embodying the invention.

Referring to the drawings, there is shown generally at 10 a housing forming a part of the preliminary centrifugal section of the dust collector. In the embodiment illustrated the housing 10 is of generally cylindrical shape. This housing may be provided with a reinforcing member 12 at the upper end and a similar reinforcing member 14 is arranged around the lower end portion of the housing 10. These reinforcing members may be rings of L-shaped cross section suitably attached to the housing 10 such as by welding.

Figure 2:
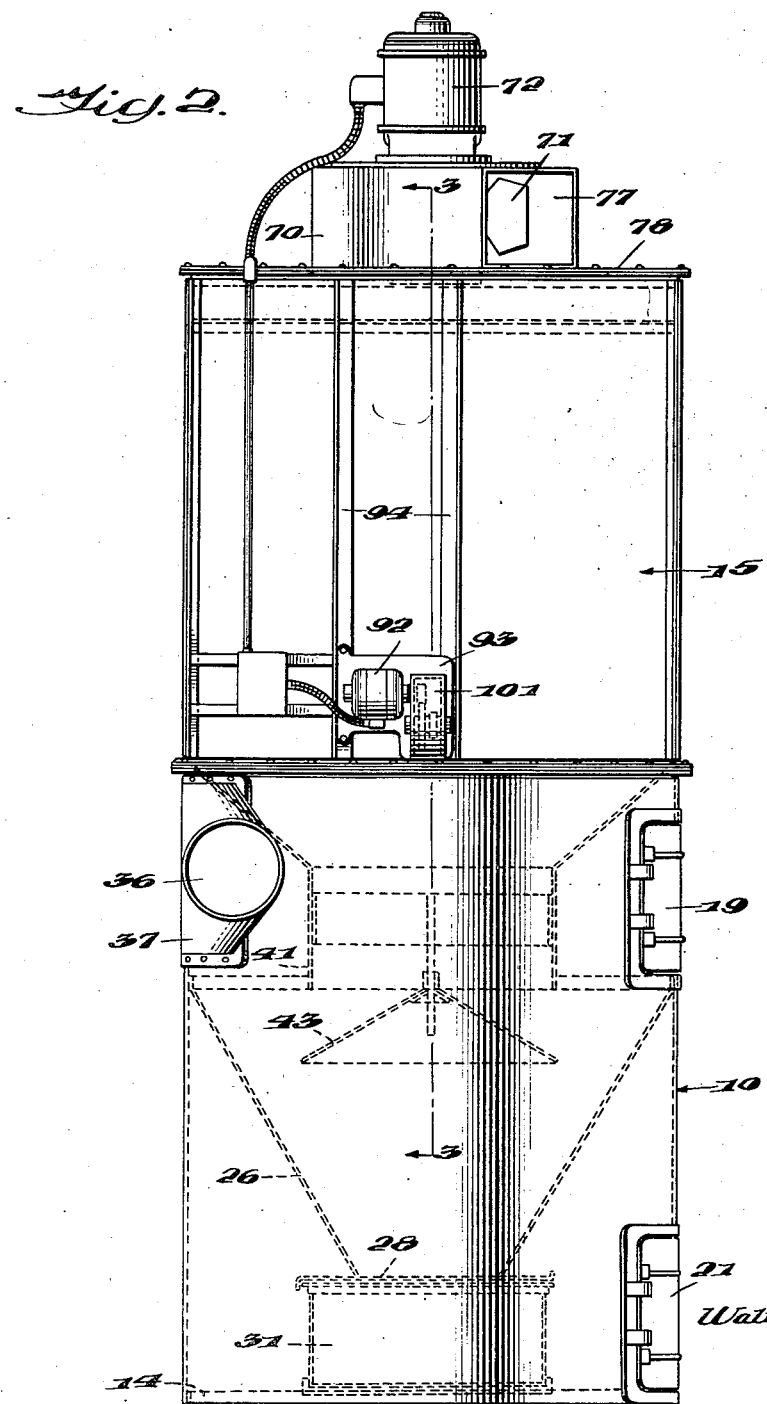
Fig. 2 is a side elevational view of the apparatus shown in Fig. 1.

The secondary filtering section is mounted on the housing 10 and includes a housing 15 encasing the filter elements hereinafter described. The housing 15 may be of any suitable cross section and in the embodiment illustrated this housing is formed with substantially flat sides to provide a square or rectangular shaped casing. The housing 15 may be reinforced by means of angle irons 16 at the top and similar angle irons 17 at the bottom thereof. These reinforcing members may be welded or otherwise secured to the sheet metal side panels. The housing 15 is preferably mounted above the housing 10 and the reinforcing members 12 and 17 may therefore be provided with holes for bolts 20 (Fig. 7) so as to secure the housings 10 and 15 in rigid assembled relationship, as shown in Figs. 1 and 2. The joint between the two housings may be sealed by means of packing material or gasket represented at 18 so as to provide a gas-tight and dust-tight connection between the two housings.

The housing 10 which forms a part of the preliminary centrifugal section is provided with openings whereby access may be gained to the interior of this unit. These openings are closed by means of doors shown at 19 and 21 in Figs. 1 and 2. The doors 19 and 21 may be provided with gaskets (not shown) to properly seal the access openings when the doors are closed. The door 21 is provided for the purpose of removing the dust particles precipitated from the dust laden gaseous medium, as hereinafter described.

The housing 15 encasing the filtering elements 52 is preferably formed of flat metal sheets suitably joined at the corners and attached to the reinforcing bars 16 and 17. The front panel 22 of this housing is preferably detachably secured to the remainder of the housing 15 so that this entire wall may be removed for inspecting and for removing and replacing the individual filtering elements 52. The front wall 22 of the housing 15 may also be provided with a door shown at 23 in Fig. 1 which may be opened for inspecting the filtering elements. The panel 22 may be strengthened by bars 25 suitably attached to the sheet material forming the front wall of the housing 15.

The preliminary centrifugal section of the dust collector includes an inverted frusto-conical shaped hopper member 26 which is mounted within the substantially cylindrical shaped housing 10 as shown in dotted lines in Figs. 1 and 2. This conical member may be welded to the inner surface of the housing 10 as shown at 27 in Fig. 3. The frusto-conical hopper member 26 extends downwardly to a point adjacent the level of the door 21, as will be apparent from a consideration of Fig. 1. The lower end of the frusto-conical hopper member 26 is provided with an unobstructed opening 28 through which the dust precipitated from the gaseous medium may escape from the hopper 26.

In carrying out the invention, means for receiving the dust removed from the gaseous medium is also arranged within the apparatus. In the arrangement shown, drawers 31 and 32 may be introduced into the housing 10 when the door 21 is open and these drawers are adapted to be sealed with respect to the lower end of the frusto-conical hopper member 26. The lower end of the frusto-conical hopper 26 is therefore provided with lateral plates as shown in dotted lines in Fig. 1 having inturned outer edges 33 for receiving lips of the drawers and maintaining these receptacles in substantially dust-tight association with the lower end of the hopper member 26. The drawers 31 and 32 may be further maintained in proper relationship with the lower end of the hopper 26 by means of guide rails 34. Thus the drawers 31 and 32 may be withdrawn when the door 21 is opened. After the drawers are emptied of dust particles these receptacles may be moved into proper positions for receiving the dust particles by sliding the drawers inwardly on the guide rails 34.

The preliminary centrifugal section is provided with an inlet opening 36 through which the dust laden gaseous medium is first introduced into the dust collecting apparatus. The inlet opening 36 is preferably formed by a tubular member 37 for connection to a pipe or conduit guiding the dust laden medium to the apparatus. The inlet opening 36 is arranged in a tangential manner with respect to the generally cylindrical shaped housing 10, as will be apparent from a consideration of Figs. 2 and 4. The dust laden gaseous medium entering the inlet opening 36 is thus directed around the inner surface of the housing 10 adjacent the top portion thereof. The preliminary centrifugal section is provided with a guide tube or baffle member shown generally as a drop tube 41 so as to form an annular space 40 between the member 41 and the inner surface of the housing 10. The baffle member 41 may be formed of sheet material and suspended in the position illustrated in Fig. 3 by means of an inverted frusto-conical shaped skirt portion 42 which is mounted at the perimeter thereof between the reinforcing rings 12 and the reinforcing bars 17. The guide tube 41 preferably depends below the lower limits of the inlet opening 36 so that the dust laden fluid medium entering the preliminary centrifugal section is guided around the periphery of the baffle member 41. The dust laden gas is thus forced to travel around the inner peripheral portion of the housing 10 so that centrifugal action is developed to throw the dust particles outwardly. The velocity of the circumferentially moving gaseous medium gradually increases as it descends in the conical hopper 26, thereby throwing out the particles by centrifugal force so that these particles settle and drop through the opening 28 at the lower end of the conical shaped hopper 26. The dust particles removed from the gaseous medium thus move into the dust receptacles 31 and 32. The inner zone of the gaseous medium or that portion nearest the axis of the cone will be substantially clear and free of dust particles, and this fluid medium may then escape through a central opening 45 in the baffle member 41 and pass into the secondary filter section.

The preliminary centrifugal section may also include means for preventing direct short circuit of the dust laden gaseous medium in passing from the inlet opening 36 to the central opening 45 formed by the baffle member 41. Such means may take the form of a conical disc member 43 adjustably mounted with respect to the annular baffle member 41. A supporting rod 44 for the conical disc 43 is illustrated as depending from spider arms 46. These arms may be attached to the baffle member 41 in any suitable manner such as by means of bolts shown in Fig. 5. The conical disc member 43 may be maintained in any adjusted position on the rod 44 by means of a set screw 47. The conical disc member 43 also serves to vary the air velocity of the gaseous medium passing upwardly through the opening 45, and such changes in the air velocity may be accomplished by adjusting the position of the conical disc 43 on the rod 44.

The spider arms 46 also provide means for preventing swirling of the gaseous medium passing through the opening 45. Thus these arms have appreciable dimensions measured axially of the opening 45. In the embodiment illustrated the spider arms are formed of relatively wide plates fabricated as two V-shaped members with the leg portions thereof extending radially from the rod 44. The arms 26 in addition to supporting the rod also serve as stationary vanes for arresting the circumferential movement of the gaseous medium passing through the opening 45 in proceeding from the preliminary centrifugal section into the secondary filtering section. The arms 46 thus constitute stream rectifying means acting to reduce the turbulence of the gaseous medium passing into the presence of the filtering elements 52.

The secondary filtering section of the dust collector is arranged above the preliminary centrifugal section and encased within the housing 15. The secondary filtering section is formed of a plurality of filter elements 52 of the cloth bag type for intercepting dust particles remaining in the gaseous medium passing upwardly through the opening 45. The secondary filtering section includes a plate arranged to form a horizontal partition 51 and provides a chamber 50 in the housing 15 sealed with respect to the compartment below the partition 51. The partition is provided with openings 58 (Fig. 8) for the passage of the gaseous medium cleansed of dust into the chamber 50 and for facilitating the attachment and sealing of the filtering elements 52 as shown in Figs. 3 and 8. Each filtering element 52 is formed of a wire mesh screen frame 53 as shown in Fig. 8 covered with a flame resistant filter bag 55 formed of suitable material such as appropriately treated cotton fabric. The individual filtering elements 52 may be constructed as shown and described in the Rosenberger Patent 2,072,906.

The supporting means for each filter element 52 comprises a clamping assembly cooperating with the horizontal partition 51. The partition 51 may be formed of metal provided with recessed portions as indicated at 56 in Fig. 8 for facilitating the attachment of the filter elements 52 to the partition 51. Each clamping assembly includes a U-shaped bridge member 57 disposed on the clean air side of the partition 51 and having its legs in engagement with the partition 51 on opposite sides of one of the port openings 58. A bolt 59 having a T-shaped head is adapted to engage under a shoulder in the end portion of the filter element. The bolt 59 extends through the opening in the end of the filter elements and freely through an opening in the bridge member 57. A wing nut 61 is threaded on the free end of each bolt 59 so that when the bolt is properly positioned through the mouth of the filter element and thereafter turned until the edges overlap the shoulder within the nozzle, the filter element may be clamped against the under side of the partition 51 as shown in Fig. 8.

The filter elements 52 are preferably of such a number as to substantially fill the housing 15 and depend from the partition 51 to positions immediately above the preliminary centrifugal section within the housing 16. The lower ends of the filtering elements 52 may be reinforced by shields 64 as will appear from a consideration of Fig. 7. These shields 64 may be detachably mounted on the lower ends of the filter element in any suitable manner and are preferably bolted to the screen frame assemblies 53. The lower ends of the filter elements 52 may be maintained in proper spaced relationship by means of a rack member 66 provided with spaced fingers 67 which project between each pair of filter elements 52 and maintain these filter elements in proper spaced relationship at the lower ends thereof.

The gaseous medium containing dust particles which were not removed in the centrifugal section pass upwardly through the opening 45 to the presence of the filtering elements 52 where these dust particles are removed from the gaseous medium. The dust carrying medium after passing through the opening 45 in the baffle member 41 spreads over a larger area whereby the velocity of the gaseous medium is reduced as it passes into the presence of the filter bags. Thus the filter elements and the cloth coverings thereon are not subjected to severe wear as a result of high velocity air currents. The spider arms 46 straighten out the swirling gaseous medium entering the opening 45 from the preliminary centrifugal section so as to further reduce the tendency of the gaseous medium to destroy the filter bags. The gaseous medium is drawn into the interior of each of the filter elements 52 through the cloth covering 55 on each and through the reinforcing screens. The dust particles are thus collected on the outer surface of the cloth of each filtering element. The gaseous medium free of dust particles then passes through the openings 58 in the partition 51 and escapes into the chamber 50 on the clear air side of the partition.

The unitary assembly herein shown and described includes means for moving the gaseous medium through the dust collector. The propelling means is preferably located on the clean air side so that the propelling mechanism functions in an atmosphere free of dust particles. A fan assembly is provided for drawing the gaseous medium through the apparatus which includes a plurality of radially arranged blades 71 mounted on and directly driven by the shaft of the motor 72. The fan is encased within a housing 70 and constitutes a suction blower which draws air through the sections of dust collector so that the gaseous medium free of dust particles escapes through an opening 76 provided in the plate 78 which serves as the top of the housing 15 and as a part of fan housing 70. The gaseous medium devoid of the dust particles is discharged through a tangentially arranged discharge orifice 77 as shown in Fig. 2. The plate 78 is provided with openings 81 at spaced points along the perimeter thereof for securing the fan housing to the dust collector assembly by means of bolts 90. The openings 81 are so arranged that the entire fan housing may be removed and turned through ninety degrees so as to adjust the position of the exhaust orifice 77 whereby the discharge of the gaseous medium free of dust particles may be arranged in at least four different directions and thereby permitting more convenient connection with a conduit which may be provided to guide the gaseous medium from the dust collector.

The rack member 66 provides means for rapping the filter elements 52 so as to shake dust particles from the cloth filters. The rack member includes the horizontally arranged bar 66 mounted for reciprocating movement transversely of the housing. The rack member may be mounted on swingable links 86 as shown in Figs. 3 and 7. These links 86 are hinged to the bars 17 which reinforce the lower portion of the housing 15. The rack member 66 is adapted to be reciprocated by means of a pitman arm 87 which is connected to the rack member 66 by a pin 88. The arm 87 extends through an opening in the side wall of the housing 15. The other end of the pitman arm 87 is arranged to embrace an eccentric member 89 keyed to a shaft 91. The shaft 91 may be driven by a small motor 92 preferably mounted outside the housing 15. In the embodiment illustrated the motor 92 is mounted on a base plate 93 which is bolted to suitable reinforcing ribs 94 as shown in Fig. 2. The motor 92 drives a pinion gear 96 and this pinion gear meshes with a gear wheel 97 attached to the shaft 91. Thus when the motor 92 drives the gear wheel 97 the eccentric member 89 is rotated to cause the pitman arm 87 to be reciprocated. This reciprocating movement of the pitman arm will cause the rack member 66 to be reciprocated lengthwise thereof whereby the fingers 67 move the lower ends of the filter elements 52 so as to shake the filter bag assemblies and the dust carried on the cloth surfaces 55 will be dislodged and fall downwardly through the opening 45 in the baffle member 41 and into the hopper formed by the false bottom 26. The dust will therefore find its way into the dust receptacles 31 and 32 through the opening 28. The shaking mechanism is so arranged that the motor 92 can only be operated when the fan motor 72 is inoperative so that the dust particles may settle into the dust receptacles. The gearing for driving the pitman arm 87 may be encased within a housing 101. The housing 101 is secured to the base plate 93 in any suitable manner and this housing carries bearings for the shaft 91.

While the invention has been described with reference to specific structural details shown in the drawings, and particularly with regard to the shape and arrangement of the preliminary centrifugal section and the secondary filter section, and the exhauster unit, it is to be understood that changes may be made in the apparatus

I claim:

1. Dust separating apparatus which comprises a chamber having an intake compartment and an exhaust compartment, a centrifugal dust separator in said intake compartment and having a central exhaust pipe delivering into said exhaust compartment and extending into said centrifugal separator to form an annular space therein, said centrifugal separator having a tangential inlet to said annular space, a dust collecting bin in said intake compartment to receive separated dust from said centrifugal separator, a bag filter in said exhaust compartment to receive air from the exhaust pipe of said centrifugal separator and means to draw air from said intake compartment through said centrifugal separator and bag filter and into said exhaust compartment.

2. A two-stage separator comprising a vertical cylindrical base section having an access door near its bottom, a dust drawer in the bottom of said section removably through said door, a downwardly tapering frusto-conical false bottom in said section having its lower end discharging to said dust drawer, a downwardly tapering frusto-conical partition above and spaced from said false bottom and having at its lower end a drop tube extending toward but terminating in spaced relation to said false bottom, said cylindrical section having a tangential inlet discharging into the space surrounding said drop tube and of less cross-sectional area than that of said drop tube, a second section of greater cross sectional area than said first section and overlying said first section, said second section having in its bottom a circular opening coextensive with the upper end of said frusto-conical partition, said second section having a top wall defining an outlet, a suction blower carried by said top wall and drawing gaseous medium from said outlet, and a cloth screen separator in said second section and interposed in the path of the gaseous medium passing from said drop tube to said outlet.

3. A dust collector according to claim 2 said suction blower being of the central inlet lateral outlet type and arranged with its central inlet juxtaposed to said top wall outlet and its lateral discharge closely adjacent and generally parallel to said top wall.

4. A dust collector according to claim 2 said suction blower being of the central inlet lateral outlet type and arranged with its central inlet juxtaposed to said top wall outlet and its lateral discharge closely adjacent and generally parallel to said top wall and said suction blower being adjustable about the axis of said unit to direct its lateral outlet in any one of several directions relative to the direction of said tangential inlet.

5. A dust collector comprising a horizontally disposed dividing wall of inverted frusto-conical shape and having a central inlet surrounded by a cylindrical drop tube, a cylindrical housing underlying and covered by said dividing wall and concentric with said drop tube and having a tangential inlet for dust laden gases, said inlet discharging into said housing above the lower end of said drop tube, a rectangular housing axially aligned with said cylindrical housing and having its bottom constituted by said dividing wall, stream rectifying means in said drop tube, said rectangular housing having closed sides and a closed top provided with an outlet connected to a suction blower, and an apertured partition interposed between said drop tube and outlet and having the elements of a cloth screen separator embracing its apertures so that the stream of gases, entering through said drop tube after expansion and centrifugal cleaning therebelow, is rectified thereby and then forced to pass through said separator elements to reach said outlet and suction blower.

6. A dust separating unit comprising a casing having two vertically superimposed compartments separated by a downwardly converging frustro-conical partition, a centrifugal separator in the lower compartment having a central exhaust pipe forming an annular space therein and delivering vertically into the upper compartment through the frustro-conical partition and having a tangential inlet to said annular space, a bag filter in the upper compartment having means for dislodging dust collected thereby, said frustro-conical partition delivering such dislodged dust downwardly through said central pipe, a dust collecting bin in said lower compartment to receive the dust separated by said unit, and means for producing flow of air through said centrifugal separator, said central exhaust pipe and said bag filter in sequence.

WALTER O. VEDDER.

REFERENCES CITED

The following references are of record in the file of this patent:

UNITED STATES PATENTS

| Number | Name | Date |
|---|---|---|
| Re. 11,252 | Haggenmacher | June 28, 1892 |
| 1,035,988 | Miller | Aug. 20, 1912 |
| 1,170,438 | Fahrney | Feb. 1, 1916 |
| 1,260,407 | Lachmann | Mar. 26, 1918 |
| 1,268,458 | Warren | Dec. 3, 1918 |
| 1,303,008 | Anderson | May 6, 1919 |
| 1,453,055 | Phelps | Apr. 24, 1923 |
| 1,647,817 | Roberts | Nov. 1, 1927 |
| 1,747,131 | Parsons | Feb. 11, 1930 |
| 1,912,280 | Kleissler | May 30, 1933 |
| 2,014,287 | Newman | Sept. 10, 1935 |
| 2,014,298 | Schneible | Sept. 10, 1935 |
| 2,072,906 | Rosenberger | Mar. 9, 1937 |
| 2,222,930 | Arnold | Nov. 26, 1940 |